United States Patent [19]

Bradford et al.

[11] Patent Number: 4,678,401
[45] Date of Patent: Jul. 7, 1987

[54] ROTOR CONTROL SYSTEM

[75] Inventors: Michael P. Bradford, Orange; Joseph R. Maciolek, West Haven, both of Conn.

[73] Assignee: United Technologies Corporation, Hartford, Conn.

[21] Appl. No.: 822,353

[22] Filed: Jan. 24, 1986

[51] Int. Cl.$^4$ .............................................. B64C 27/24
[52] U.S. Cl. ..................................... 416/32; 416/143; 416/170 R; 416/169 R
[58] Field of Search ...................... 416/32, 143, 169 R, 416/170 B; 244/7 R, 7 A, 17.11, 17.13

[56] References Cited

U.S. PATENT DOCUMENTS 3,698,662 10/1972 Rostad ............................ 416/143 X
3,986,686 10/1976 Girard ................................ 244/7 A
4,342,378 8/1982 Hmelovsky ........................... 187/29
4,354,234 10/1982 MacLennan et al. ........... 416/143 X
4,374,350 2/1983 Kohzai et al. ......................... 318/590
4,376,979 3/1983 Fowler et al. .................. 416/143 X
4,394,889 7/1983 Gray ...................................... 187/29

Primary Examiner—Everette A. Powell, Jr.
Attorney, Agent, or Firm—Gerald E. Linden

[57] ABSTRACT

A helicopter rotor control system (13) including a stop azimuth controller (32) for establishing the value of a deceleration command (15') to a deceleration controller (23), a transition azimuth predictor (41) and a position reference generator (55), which are effective during the last revolution of said rotor (14) to establish a correction indication (38) to adjust the deceleration command (15') to ensure that one of the rotor blades (27) stops at a predetermined angular position.

4 Claims, 4 Drawing Figures

ROTOR CONTROL SYSTEM

The invention described herein was made in the performance of work under NASA Contract No. NAS2-11771 and is subject to the provisions of Section 305 of the National Aeronautics and Space Act of 1958 (72 Stat. 435; 42 U.S.C. 2457).

TECHNICAL FIELD

This invention is directed toward the technical field of electrohydraulic controls, and particularly toward the category of the electrohydraulic arts relating to helicopter rotor control.

BACKGROUND ART

Currently, rotor brake systems for helicopters and other rotating systems operate in many cases by applying a constant pressure from a discrete valve, which is switched on and off by the operator to one or more hydraulic brake calipers. Under such an arrangement, however, the deceleration profile of the rotor and the specific rotor blade stop-azimuth value are uncontrolled.

Further, helicopters now in production have their rotor heads either manually rotated to a proper angle (via a ground support rope, for example, connected to a tugging point provision on the rotor blade) or hydraulically driven to a proper angle by an indexing, motor/gear assembly.

Other known rotor brake systems, for example, U.S. Pat. No. 4,374,350, issuing on Feb. 15, 1983, to Kolzai et al., include control systems for stopping the spindle of a machine tool at a predetermined rotational position. However, the system shown in this patent employs a proportional magnetic sensor fastened to a rotating shaft in order to locate desired stop angles. The sensor is thus operable over only a small angle, and this renders control nonadaptive to sudden torque disturbances and unschedulable. The arrangement shown in this patent further controls electrical circuitry in the first instance rather than controlling brake mechanics directly.

The arrangement shown in another document, U.S. Pat. No. 4,394,889, which issued on July 26, 1983, to inventor Gray, shows how to stop an elevator (rather than a helicopter rotor blade). This is useful background art, because the elevator stops at a predetermined elevational level. The scheme indicated in the patent uses constant braking pressure, open loop control techniques, and a delay feature based on velocity of the elevator to achieve the selected stop position.

Similarly, U.S. Pat. No. 4,342,378, issued to inventor Hmelovsky on Aug. 3, 1982, is of general interest, as it discloses a technique for stopping an elevator door at a selected position. In this system, discrete positions are selected during door closure to control prescheduled door acceleration and deceleration values. The system accordingly slows the elevator doors to a small velocity and then accomplishes actual stoppage by impact.

Each of the above-indicated, known arrangements either depend upon prescheduled position control laws or permit shaft angle overshoot. For helicopter rotors, such control techniques would only crudely position the rotor, because of the complex acceleration and deceleration effects acting on the rotor blade during braking operation under normal or gusty wind conditions.

For the sake of providing an analytical basis for discussion, it is noted at this point that a helicopter rotor including a selected plurality of blades and having an angular velocity "W" will follow the motion equation: $(Wf)(Wf) = (Wi)(Wi) - 2\, dW(\text{delta } P)$, where "Wf" is the final angular velocity of a selected rotor blade, "Wi" is the initial angular velocity of the rotor blade, "dW" is the rate of change of angular velocity of the rotor, and "delta P" is the angle through which the rotor turns during the evolution from initial to final velocity. According to this relationship, rotor motion is considered stopped when $Wf = 0$. At that time, $(Wi)(Wi) = 2\, dW(\text{delta } P)$. And further: "delta P" will then equal $(Wi)(Wi)/2\, dW$.

Disclosure of the Invention

According to the invention, the deceleration of a helicopter rotor is accomplished in a manner ensuring that the rotor stops at an adjacent one of several predetermined rotor azimuth positions as a result of an adaptive control system which continually determines the stop position of the rotor and updates it to coincide with one or more desired acceptable stop positions.

According to the invention, a control system is described herein which desirably positions the rotor at a desired azimuth using a standard disk brake, thereby avoiding the weight and complexity of ancillary rotor positioning motors and ground support equipment.

Other features and advantages will be apparent from the specification and claims and from the accompanying drawings which illustrate an embodiment of the invention.

BRIEF DESCRIPTION OF DRAWING(S)

BEST MODE FOR CARRYING OUT THE INVENTION

Figure 1:
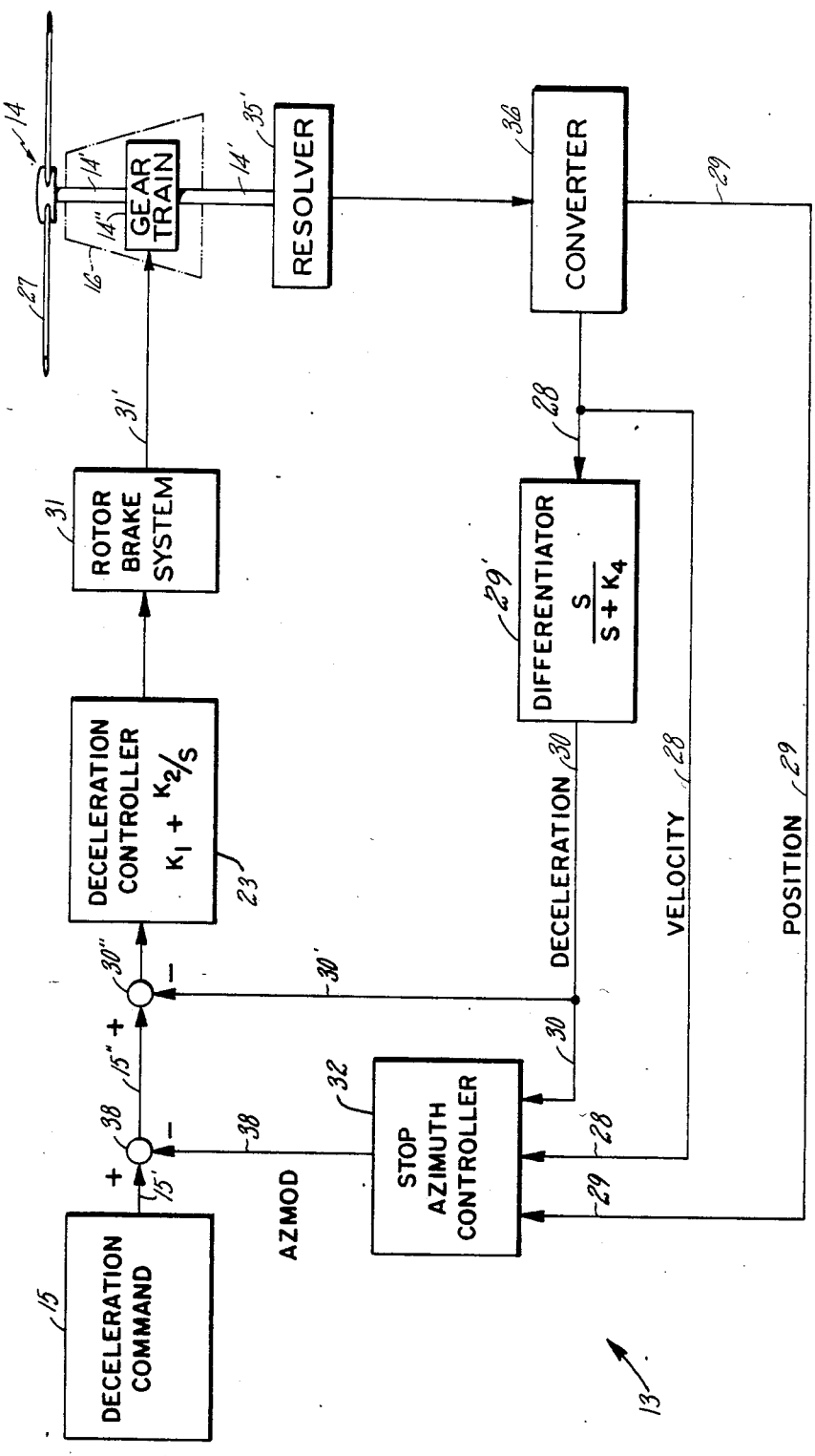
FIG. 1 is an overall block diagram of a rotor control system for controlling the deceleration and final stop azimuth of a rotor according to the invention herein.

FIG. 1 shows a rotor control system 13 for controlling the deceleration and final stop azimuth of a rotor 14, according to the invention herein. More particularly, FIG. 1 shows a deceleration controller 23 driven by the error between commanded and actual deceleration paths of the rotor 14, which includes a predetermined number of blades 27. Further, controller 23 is driven bV a difference signal from a deceleration command element 15 and a stop azimuth controller 32 as will be discussed.

In particular, according to a version of the invention, helicopter rotor brakage by a rotor brake 31 is controlled in part by a stop azimuth controller 32 responsive to signals indicative of rotor position, velocity and deceleration. This controller 32 predicts at which point a selected rotor blade 27 will stop without intervention by the controller 32 and then intervenes, for example, when less than a single rotation remains, to establish an error signal "AZMOD" in view of a predetermined set of reference positions, which then modifies the deceleration command 15 until the predicted stop azimuth of a selected one of rotor blades 27 coincides with an adjacent one of said predetermined reference positions, the number thereof depending upon the number of rotor blades 27.

The deceleration controller 23, in turn, controls the rotor brake 31 which in turn is effective for controllably braking the motion of the rotor 14.

Figure 4:
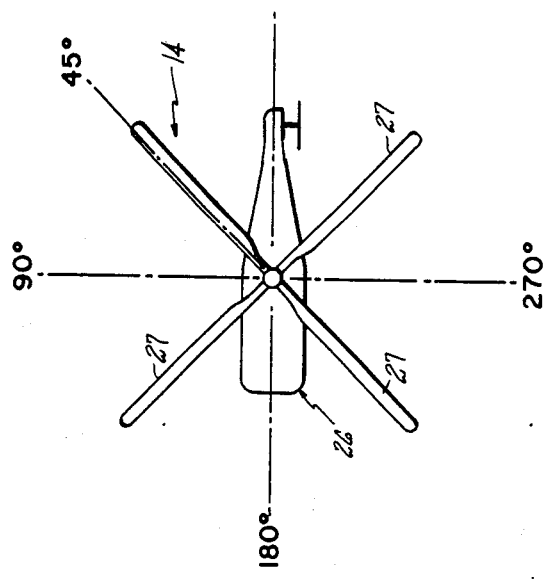
FIG. 4 shows a top view of a helicopter in schematic which shows the rotor blades at an angle of 45° from the direction of travel.

The rotor 14 shown in FIG. 4 is part of a helicopter 26 and carries the helicopter 26 by rotating about its axis during flight. Each rotor has a selected plurality of blades 27 and in this case particularly four such blades 27. The rotor 14 can further be characterized in terms of the position, velocity and acceleration of these blades 27. Velocity and position can physically be sensed in any of a number of well-known manners to establish velocity and position indications, respectively 28 and 29. According to a preferred version, the rotor of a brushless resolver 35' (e.g., Singer Aerospace CU09609247-0) is connected to the rotor shaft of helicopter 26 in order to obtain rotor position and velocity indications for subsequent processing. A deceleration indication can be derived mathematically by differentiating the velocity indications 28 with differentiator 29', as suggested in FIG. 1, to produce a deceleration indication 30. Differentiation is implemented by the standard technique of dividing the difference between two measured velocity values by the time interval between the measurements. Expressed mathmatically: Deceleration=(V Final−V Initial)/Time Interval. The signal is then smoothed in the perferred embodiment by a two-pole 75 millisecond time constant filter. The filter removes the noisiness associated with the calculation of the digital derivative, thus producing a deceleration indication 30 suitable for use in controller 32.

FIG. 1 sets forth the feature of control system 13, and also shows its relationship with rotor brake 31, and rotor 14 including rotor shaft 14', gear train 14" and transmission 16. Resolver 35' monitors the position of shaft 14' and provides a signal indicative thereof to the resolver 35', which in turn produces an electrically compatible position indication 29 and velocity indication 28 as shown in FIG. 1. More particularly, the electrical outputs of the resolver 35' thus define rotor shaft angle with respect to this reference, and are sent to the inputs of a Resolver-to-Digital converter 36 (e.g., Analog Devices 1S64) that produces digital position and analog velocity outputs, respectively 29 and 28, from standard resolver inputs. This arrangement operates continuously to provide the indicated position and velocity data whether or not the rotor 14 is stopped or rotating.

Rotor brake 31, according to FIG. 1, applies a controlling influence 31' to the gear train 14" of rotor 14 in response to deceleration controller 23, thereby directing the operation of the brake system 31 to accomplish effective braking action. By way of further detail, which is not specifically illustrated, the brake system 31 may typically include electrical and mechanical portions including, for example, a source of hydraulic pressure (not shown) in turn controlled by a suitable electrohydraulic valve. Gear train 14" would, according to such a scheme, be coupled to a brake disk subject to braking pressure by a brake caliper (not shown) which is controlled by fluid pressure from the valve. The caliper would apply friction forces to the brake disk through suitable pucks, for example, when activated, establishing a desired decelerating torque upon the brake disk, the pucks being set to operate at a selected radius away from the center of the brake disk. The electrical portion of the brake system 31 would receive a control signal from the deceleration controller 23, and would process this signal through a suitable pressure controller (not shown), representable for example, by a transfer function such as $(K3+K7/s)(s+K5)/(s+K6)$. The pressure controller would, for example, output a voltage signal to an interface effective for generating a proportional drive current in turn effective for controlling an electrohydraulic valve such as, for example, a jet pipe style valve, which governs the application of pressure to the brake caliper. To effectively establish acceptable pressure control operation, feedback of pressure actually applied to the brake caliper could be conducted to an input node of the pressure controller for comparison with the input deceleration controller signal. This feedback is capable of accomplishment through a suitable pressure transducer and interface, and results in the establishment of an error indication between commanded and actual pressure to drive the pressure controller. The pressure transducer may, for example, be a strain-gauge bridge-type having integral amplification and EMI protection features. One such transducer is the Kulite IPTE-31-1000 device, and it is preferably mounted in the hydraulic line between the electrohydraulic valve and the brake caliper.

According to the invention, during the time of the last rotation of rotor 14, for example, a stop azimuth controller 32 influences the remaining rotational angle through which the rotor 14 will turn prior to stopping, in response to current velocity, position and acceleration values respectively 28, 29 and 30. Updating of the stop azimuth controller 32 for example, occurs at 40 hertz.

FIG. 1 further shows feedback of a deceleration signal along line 30' to node 30'' from the differentiator 29', for example operating according to a transfer function such as $s/(s+K4)$, which converts velocity indications 28 to deceleration indications 30 and thereby ensures stable feedback operation of control system 13 with deceleration signal 30 enabling comparison of actual deceleration with the input deceleration command produced at block 15. Another version of the transfer function which is preferred can be expressed as $s/(Ts+1)^2$, this function in effect results in smoother signal response than the former. The difference between the deceleration signal from differentiator 29' and the deceleration command indication 15'' at node 30'' will normally be zero (0), yielding a constant brake pressure command signal according to transfer function $K1+K2/s$. In the event that external torques or variations in the brake coefficient of friction change the actual deceleration, the said difference will deviate from zero and result in a change in brake pressure sufficient to equalize the commanded and actual decelerations once again.

The gains K1 and K2 are selected to place an open-loop zero at the dominant closed-loop pole of the pressure control system, and to control the stability of the deceleration time response. In a preferred svstem, the deceleration controller has a transfer function of $(320.+3520/s)$ in pounds per square inch per radian per second per second deceleration error.

Applying a deceleration command 15 to the deceleration controller 23 and thus to rotor brake 31 will thus decelerate the rotor 14. However, this will not enable control of the ultimate rotational position of the rotor when it halts, because line 30' enables the monitoring of deceleration error only, and does not monitor rotor velocity 28 and position 29 as time passes.

Figure 2:
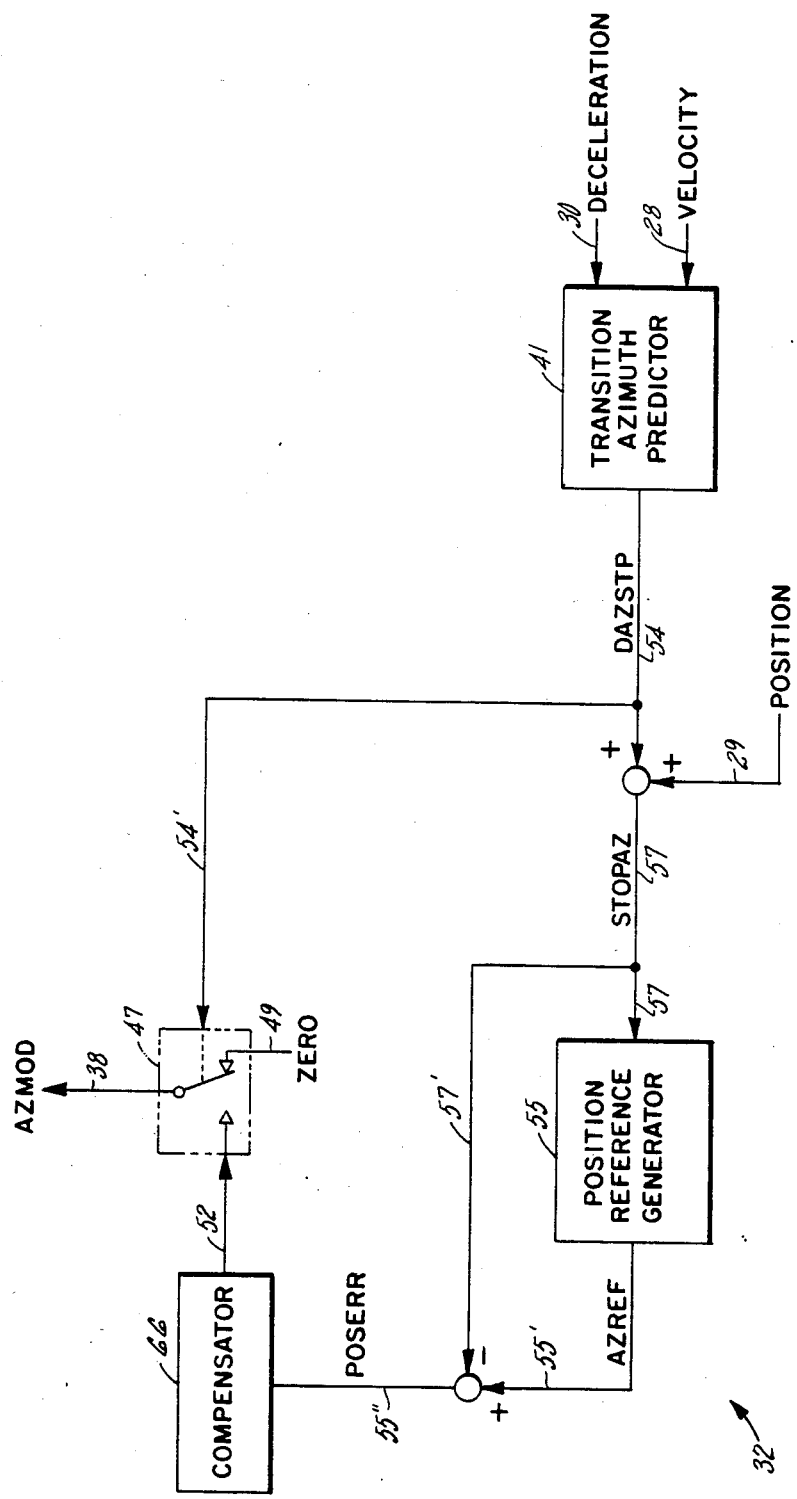
FIG. 2 is a block diagram of the stop azimuth controller portion of the deceleration controller.

Thus, according to the invention, control circuit 13 additionally comprises a stop azimuth controller 32, which produces an output signal designated "AZ-MOD" as shown by reference to FIG. 2. In particular, the AZMOD signal continually modifies the deceleration command 15' such to cause the future stop position of the rotor 14 to be coincident with one of a set of desired stop positions until all angular motion ceases. The introduction of azimuth modification signal "AZ-MOD" enables establishment of deceleration command signal 15'', namely the sum of one deceleration command indication 15' and AZMOD, the command modifier required to stop the rotor at a desired angle.

Such control is enabled by consideration of position, velocity and deceleration signals by the stop azimuth controller 32 as suggested in FIGS. 1 and 2. In particular, as shown in FIG. 2, a transition azimuth predictor 41 receives deceleration and velocity signals, respectively 30 and 28, and processes them according to the relationship delta $P=(W_i)(W_i)/2dW$ for example, under which condition the angular velocity of one of rotor blades 27 will have reached zero. Transition azimuth predictor 41, thus establishes position signal "DAZSTP", which is equivalent to "delta P", on line 54 which represents the angle remaining to be traveled by the rotor 14 before it will stop.

This value of DAZSTP is added to current rotor position indication 29 to establish STOPAZ, the angle to be traveled by a selected rotor blade 27 with respect to the start of a current 360° position cycle, until stoppage by it or another one of rotor blades 27 at a particular angular position. For values of STOPAZ greater than 360°, STOPAZ is normalized to the rotational cycle by subtraction of 360° within a normalizer (not shown). For example, if the transition azimuth predictor determines that 340° of rotation remains before the rotor stops and the current position of the rotor from the zero reference is 160°, then STOPAZ is equal to 160°+340°=500°, but normalized STOPAZ is equal to 500°−360°=140°.

According to the invention, when DAZSTP is less than one revolution, i.e., less than 360°, switch 47 engages with line 52 from signal compensator 66, under the direction of control line 54' to produce a nonzero AZMOD signal 38 to increase or decrease the deceleration command level. Switch 47 is normally connected to input 49, which is set to zero. Thus, the AZMOD signal is normally zero. However, according to the invention herein, a nonzero indication 52 can be established under control of line 54' which is driven by the DAZSTP signal 54 discussed above to ensure that the rotor blades 27 come to a halt in the precisely predetermined configuration already indicated without overshoot.

When the rotor 14 has reached less than or equal to one revolution before its stop point, as determined by the transition azimuth predictor 41, stop azimuth controller 32 applies, the corrective deceleration command already defined as "AZMOD" along line 38, which may be positive or negative in polarity. This forces the glide path of the rotor 14 to a stop at a selected azimuth, such as 45° from a predetermined zero reference such as the direction of travel of helicopter 26 or its opposite, for example, enabling the rotor blades 27, according to one version, to act as wings for helicopter 26 during forward translation.

Should external effects, such as wind, upset the established glide path at this point, to a degree that exceeds the control authority of the correction signal, the stop azimuth controller 32 selects a next appropriate stop azimuth value through position reference generator 55, as will be discussed, which exercises a new deceleration command "AZREF" along line 55' directed toward and focused upon the new stop azimuth position.

As already suggested, FIG. 2 shows the internal operation of the stop azimuth controller 32 in great detail. By way of further information, the transition azimuth predictor 41, continually updates the remaining angle through which the rotor 14 will turn. This angle "DAZSTP" is added to the current rotor position to establish normalized stop azimuth indication.

Figure 3:
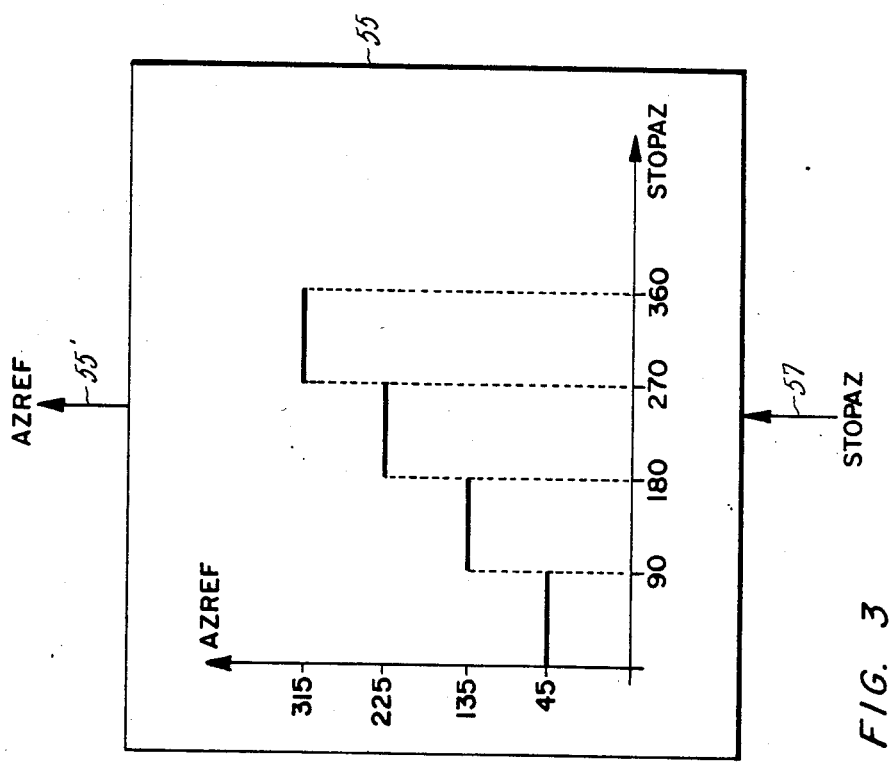
FIG. 3 is a diagram indicating a position reference generator relationship according to one version of the invention.

The normalized stop azimuth indication is used by the position reference generator 55 as shown in FIG. 3 to select the closest position for any one of rotor blades 27 to one of several desired stop points "AZREF" which according to one version of the invention in which helicopter 26 has four blades 27 include positions at 45, 135, 225 and 315 degrees for example.

After establishment of a desired stop position for a selected blade 27, the difference between AZREF and normalized STOPAZ is calculated and defined as position error "POSERR" 55''. This reflects the error that would occur without brake modulation or further modulation and is the amount of correction to be applied to stop the selected blade 27 at a desired position in view of its current position. According to one example, POSERR could be −5 degrees. Maintaining the negative sign through the compensator 66, AZMOD would also be negative, thus indicating to the deceleration controller 23 that an increase in deceleration is needed to bring the rotor to a stop 5 degrees sooner.

The AZMOD signal 38 is created by adjusting the scale and phase of the established POSERR signal 55'' in compensator 66, according to well-known techniques to match the signal output 52 of comoensator 66 to the range of deceleration command indication 15'. "POSERR" is thus modified to make it compatible with the level and character of the deceleration command 15 output mentioned above. Compensator element 66 in particular incorporates one pole at the origin to improve the steady state error performance of this position control loop, and two low frequency zeros to stabilize and damp the position error step response. In the preferred embodiment, the transfer function of compensator 66 is $(0.14\ s+1)(0.13\ s+1)(0.0015)/s(0.05\ s+1)$, in radians per second per second per degree of azimuth position error.

The position reference generator 55 particularly observes the input value of normalized STOPAZ 57, and outputs a predetermined angular value of "AZREF". The predetermined value of AZREF can be arbitrarily selected to cause a particular one of blades 27 to halt at a desired azimuth position, or the position reference generator 55 can have several AZREF values as shown in FIG. 3 depending upon the number of rotor blades 27. These angular values are selected for example, as regularly spaced around a perimeter of 360° according to the number of blades 27 and can be offset arbitrarily. The output signal AZREF 55' thus outputs a preferred stop position by establishing a reference value AZREF nearest normalized STOPAZ, thus stopping a selected blade 27 at a predetermined position, according to the invention. As already noted, according to one version of the invention which is directed toward a four-blade helicopter 26, stopping is desired to occur at either 45, 135, 225, or 315 degrees.

POSERR 55" is processed to form signal AZMOD, in a fashion compatible with control system speed 13 and stability requirements not already noted above. In particular, according to one version of the invention, the ratio AZMOD/POSERR equals $(t_1s+1)(t_2s+1)/(t_3s+1)s$.

The signal AZMOD 38 thus modifies the commanded deceleration 15 and in turn controls rotor brake 31 in a direction that reduces POSERR 55" to zero over time. Once zeroed, any deviation of POSERR 55" from a zero value results in a change in brake pressure to reestablish POSERR at zero. In this manner of continual updating and rezeroing of stop position error 55', the rotor is guided to a rest point coincident with a desired azimuth without overshoot.

It should be understood that the invention is not limited to the particular embodiments shown and described herein, but that various changes and modifications may be made without departing from the spirit and scope of this novel concept as defined by the following claims.

We claim:

1. A control system for slowing the angular velocity and halting the rotary motion of a helicopter rotor at a selected azimuth position with a rotor brake, said rotor including a plurality of blades for rotatably carrying said helicopter, said control system comprising a deceleration controller for controlling the operation of the rotor brake, a deceleration command means for establishing a deceleration command indication for directing the operation of said deceleration controller, a detection means for establishing motion indications of said helicopter rotor, said indications including velocity and position indications, said detection means being responsive to the motion of said helicopter, a feedback means for differentiating said velocity indication to establish a deceleration value of the rotor, and means for reducing said deceleration command indication by the amount of said deceleration value and providing the difference to said deceleration controller, wherein said control system is characterized in that it further comprises means for determining a predicted stop azimuth position of said rotor, and adjustment means for adjustment of the value of said predicted stop azimuth position to a selected stop azimuth.

2. The control system of claim 1, further characterized in that it comprises a means for predicting a stop value of a selected one of said blades in view of the current deceleration and velocity of said rotor, and a position reference generator producing an indication of the closest one of a number of discrete, equally spaced angular values corresponding to the number of blades on said helicopter, said closest one of said angular values being closer to the predicted stop value for said selected blade, than any other of said angular values.

3. The control system of claim 2, characterized in that the difference between said predicted stop value and said closest one of said angular values establishes a position error for adjusting said deceleration command value.

4. The control system of claim 1, characterized in that said deceleration command is adjusted only during the time of last rotation of said rotor before coming to a halt.

* * * * *